United States Patent [19]
Napier

[11] Patent Number: 5,465,466
[45] Date of Patent: Nov. 14, 1995

[54] FASHION FRAME CHAIN HOLDERS

[76] Inventor: Kandie K. Napier, 245 Delaware St., #111, Tonawanda, N.Y. 14150

[21] Appl. No.: 301,247

[22] Filed: Sep. 6, 1994

[51] Int. Cl.[6] .................................................. A44B 21/00
[52] U.S. Cl. .................................... 24/3.3; 24/3.11; 24/3.13
[58] Field of Search ................................ 24/3.3, 3.1, 3.6, 24/3.11, 3.13, 555; 2/445

[56] References Cited

U.S. PATENT DOCUMENTS

| | | | |
|---|---|---|---|
| 3,879,804 | 4/1975 | Lawrence | 24/3.3 |
| 4,471,509 | 9/1984 | Marks | 24/3.3 |
| 4,965,913 | 10/1990 | Sugarman | 24/3.3 |
| 4,974,956 | 12/1990 | Gill | 24/3.13 |

*Primary Examiner*—Victor N. Sakran
*Attorney, Agent, or Firm*—Howard J. Greenwald

[57] ABSTRACT

An eyeglass retaining assembly comprising a flexible necklace with a proximal end and a distal end, a first spring ring attached to the proximal end of the necklace, a solid ring assembly attached to the distal end of said necklace, a first frame holder attached to the first spring ring, and a second frame holder attached to a second spring ring.

15 Claims, 2 Drawing Sheets

FASHION FRAME CHAIN HOLDERS

FIELD OF THE INVENTION

A necklace assembly for maintaining a pair of eyeglasses about the neck of a wearer which is comprised of a necklace, a first eyeglass frame chain holder attached to one end of necklace, and a second eyeglass frame chain holder attached to the other end of the necklace.

BACKGROUND OF THE INVENTION

Devices for maintaining eyeglasses about the neck of a wearer are well known to those skilled in the art. Thus, by way of illustration, one such device is described, e.g., in U.S. Pat. No. 4,471,509 of Marks. The entire disclosure of this patent is hereby incorporated by reference into this specification.

All of the prior art eyeglass retaining devices are substantially ineffectual: they fail to hold the eyeglasses in place over extended periods of time. Some of these prior art devices are made from plastic tubing and are usually adjusted with a metal spring. Others of these prior art devices are made from a flexible elastomeric material which is attached to a ball or bell. However, both types of these devices have a relatively short useful life, failing to retain the eyeglass assemblies after about a month (or less) of continual use.

An example of the latter type of prior art device is illustrated in U.S. Pat. No. 4,471,509 of Suzanne L. Marks. The "resilient strap material" used in the device of the Marks patent loses its resiliency after a short period of repeated use, and, thus, renders the eyeglass retaining assembly substantially useless.

It is an object of this invention to provide an assembly for retaining eyeglasses which, even after repeated use over an extended period of time, will effectively retain such eyeglasses.

It is another object of this invention to provide an assembly for retaining eyeglasses which will withstand substantially more force and abuse by a user than will prior art eyeglass retaining assemblies.

It is yet another object of this invention to provide a pair of frame chain holder devices which can be removably attached to a variety of different necklaces, chains or straps.

It is yet another object of this invention to provide a pair of frame chain holders which, even after repeated exposure to sunlight, will not discolor.

SUMMARY OF THE INVENTION

In accordance with this invention, there is provided an eyeglass retaining assembly comprising a flexible necklace with a proximal end and a distal end, a first spring ring attached to the proximal end of the necklace, a solid ring assembly attached to the distal end of said necklace, a first frame holder attached to the first spring ring, and a second frame holder attached to a second spring ring.

BRIEF DESCRIPTION OF THE DRAWINGS

The invention will be illustrated by reference to the following drawings, in which like elements are described by like numbers, and in which.

DESCRIPTION OF THE PREFERRED EMBODIMENTS

Figure 1:
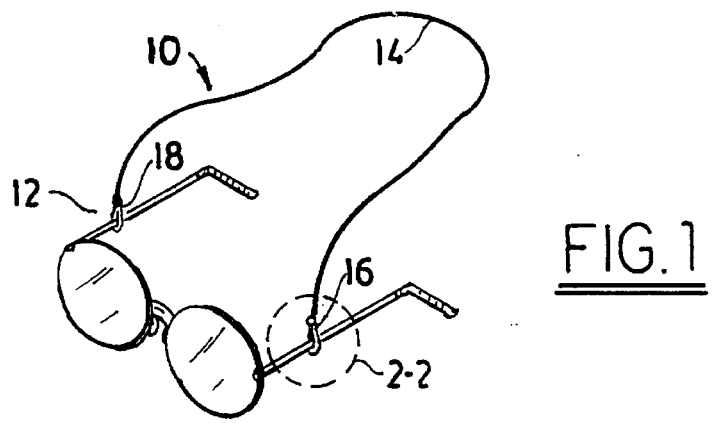
FIG. 1 is a perspective view of one embodiment of a prior art device.

FIG. 1 is a perspective view of a prior art necklace assembly 10 removably attached to a pair of eyeglasses 12. Referring to FIG. 1, it will be seen that necklace assembly 10 is comprised of a necklace 14, a first chain holder 16, and a second chain holder 18.

As used in this specification, the term necklace refers to an ornament, such as a string of beads or a flexible metal chain or band, worn around the neck.

The necklace illustrated in FIG. 1 may be used in the apparatus of applicant's apparatus. Referring again to FIG. 1, the necklace 14 is comprised of an elongate flexible strand. Any of the necklaces known to those skilled in the art may be used as necklace 14. Thus, by way of illustration and not limitation, one may use one or more of the chain necklaces disclosed in U.S. Pat. Nos. D335,854, 5,303,540 (rope chain), 5,301,498 (rope chain), 5,214,940 (jewelry chain), 5,211,284, 5,157,945, 5,148,689, 5,134,862, 4,672, 724, 4,651,541, 4,628,708, 4,527,316, 4,448,017, and the like. The disclosure of each of these United States patents is hereby incorporated by reference into this specification.

Thus, by way of further illustration, the necklace 14 can be a rope structure, a strap structure, an elongated cord, and the like. See, e.g., U.S. Pat. No. 4,965,913 (woven cord necklace), 4,974,956 (elongated flexible cord), and the like. The disclosure of each of these patents is hereby incorporated by reference into this specification.

As is known to those skilled in the art, necklaces are readily commercially available. Thus, e.g., referring to the August, 1993–July 1995 "River Gems and Findings" catalog (published by River Gems and Findings, 6901 Washington Street N.E., Alberquerque, N.Mex. 87109), one may use a FIG. 8 chain (catalog number 632-249/18), a triple long and short chain (catalog number 632-240/18), a rolo chain (catalog number 632-365/18), a Venetian box chain (catalog number 632-270/16), a twisted Venetian box chain (catalog number 632-382/18) a diamond cut chain (catalog number 632-373/18), a curb chain (catalog number 632-259/16), a diamond cut curb chain(catalog number 632-388/18), a heavy beveled curb chain (catalog number 632-391/18), a coin-shaped natural freshwater pearl strand (catalog number 820-120), a pillow-shaped natural freshwater pearl strand (catalog number 820-127), a blue agate strand (catalog number 081-810), a petrified wood agate strand (catalog number 070-265), a zamiba amethyst bead strand (catalog number 067-473), an aventurine bead strand (catalog number 065-890), a cow bone strand (catalog number 070-226), a salmon pink coral strand (catalog number 067-819), a leopard jasper bead strand (catalog number 083-758), a genuine natural lapis lazuli AAA grade bead strand (catalog number 065-084), a malachite strand (catalog number 067-389), a rose quartz bead strand (catalog number 067-443), a brown cockles shell strand (catalog number 083-827), a tiger's eye bead strand (catalog number 070-468), an Italian glass bead strand (catalog number 084-246), a Cloisonne bead strand (catalog number 084-430), a porcelain bead strand (catalog number 064-082), a ceramic bead strand (catalog number 082-800), and the like.

In one preferred embodiment, a string of beads is strung upon a relatively strong stringing material, such as, e.g., stringing cord. One may purchase many different types of beads and/or other decorative objects which can be disposed on the stringing material from, e.g., the aforementioned Rivers Gems and Findings catalog. Thereafter, one may also purchase stringing cord from such catalog. Alternatively, or additionally, one may purchase beads and/or other decorative objects already strung.

Referring to pages 312-324 of such Rivers Gems and Findings catalog, one may use silk bead cord (catalog number 635-100), nylon bead cord (catalog number 635-350), pearl silk bead cord (catalog number 635-250), wax thread (catalog number 635-483), polyester cord (catalog number 635-305), Nymo bead cord (catalog number 635-276), and the like.

In one preferred embodiment, beads and/or other decorative objects are strung on an "ACCULON" stringing material which is comprised of from 3 to 7 strands of stainless steel wound together into a cable and coated with nylon; this material is sold by the Cablestrand Corporation of 2660 Signal Parkway, Long Beach, Calif. 90806

Figure 9:
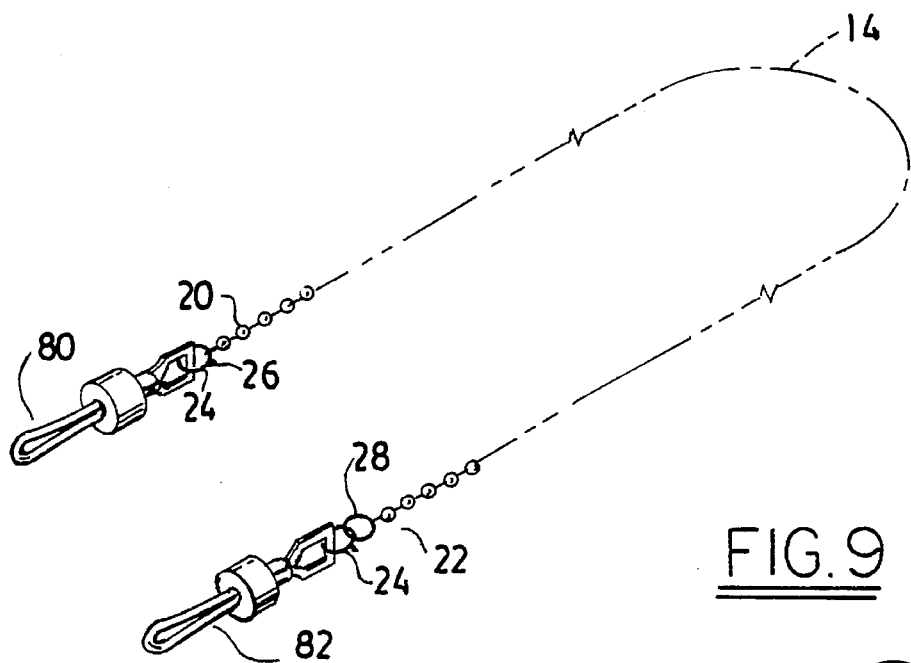
FIG. 9 is a top view of the assembly of FIG. 8.

The necklace 14 used in the assembly 10 of this invention is comprised of a proximal end 20 and a distal end 22 (see FIG. 9). Referring to FIG. 9, it will be seen that proximal end 20 of necklace 14 is attached to a spring ring 24. Spring ring 24 is comprised of loop 26.

Spring rings are well known to those skilled in the art. See, e.g., element 46 of FIG. 10 of U.S. Pat. No. 4,974,956 and column 2 (which refers to spring ring 22). As is disclosed in such patent, "The spring ring 22 includes arcuate gap 24 sized to permit passage of the solid ring 20. The gap is typically closed by an arcuate internal pin 26 urged across the gap by a spring (not shown). The pin 26 may be retracted with a nail, for example, through the extension 28 of the pin."

Such spring rings are well known to those skilled in the art and are readily commercially available. Thus, referring to page 305 of the aforementioned River Gems and Findings catalog, one may use a Sterling Spring Ring with a 7 millimeter diameter opening (catalog number 630-120), or a comparable gold or brass or plated spring ring. In general, it is preferred that the diameter of the spring ring vary from about 5 to about 8 millimeters.

Referring again to FIG. 9, it will be seen that the distal end 22 of necklace 14 is connected to a solid ring assembly 28.

Referring again to FIG. 9, and in the preferred embodiment illustrated therein, it will be seen that sold ring assembly 28 is a solid ring which, because it is defined by a continuous ring of metal which cannot be opened readily upon the application of force to any part of it, securely attaches necklace 14 to spring ring 24.

These type of solid rings are well known to those skilled in the art and are described in, e.g., U.S. Pat. No. 4,471,509 (see element 20). Reference also may be had to page 305 of the aforementioned River Gems and Findings catalog (see catalog number 630-159, sterling jump ring).

Instead of a solid ring, one may use any other structure which has an orifice defined by a continuous perimeter of metal which cannot readily be opened. Thus, e.g., one may use a chain tag in place of such solid ring.

As is known to those skilled in the art, chain tags are integral assemblies comprised of two or more orifices. Thus, referring to page 310 of said River Gems and Findings catalog, one may use a triple ring chain tag (see catalog number 630-273), a closed ring chain tag (see catalog 630-250 or 630-274), or an open ring chain tag (see catalog number 630-272).

Regardless of the type of assembly used, the solid ring assembly should be capable of withstanding a substantial amount of force without opening. Thus, the solid ring assembly is preferably integral and continuous.

Figure 2:
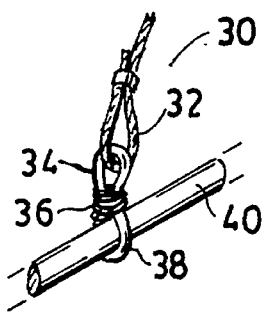
FIG. 2-5 are views of a prior art eyeglass retaining assembly.

FIG. 2 is a partial perspective view of a prior art eyeglass strap 30 comprised of a cord 32 attached to plastic tubing 34. A metal spring 36 compresses tubing 34 and produces a loop through which the stem 40 of eyeglasses 12 may be inserted.

Figure 3:
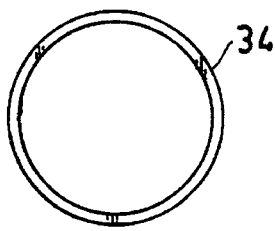
Figure 4:
Figure 5:
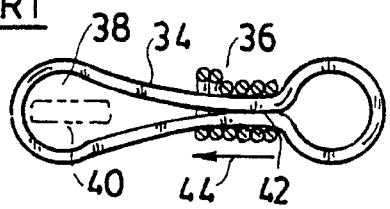

FIG. 3 is a front view of plastic tubing 34 prior to the time it is compressed. FIG. 4 is a side view of tubing 34 prior to compression. FIG. 5 shows how tubing 34, when compressed by metal spring 36, is formed into loop 38 and loop 40. As will be apparent to those skilled in the art, metal spring 36 might tend to cut portion 42 of tubing 34 over a period of time.

Referring again to FIG. 5, when metal spring 36 is moved in the direction of arrow 44, the size of loop 38 will decrease, and it will tend to grasp stem 40 more securely.

Figure 6:
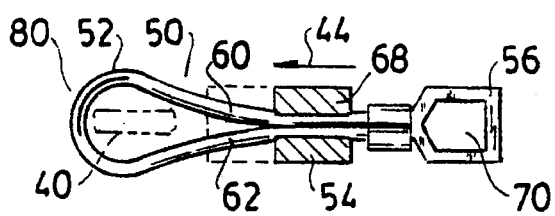
FIG. 6 is a side view of one preferred frame holder used in the assembly of applicant's invention.

FIG. 6 is a side view of one of applicant's preferred frame holders 50. Referring to FIG. 6, it will be seen that frame holder 50 is comprised plastic cord 52, bead 54, and crimp end 56.

Plastic cord 52 is preferably a non-resilient structure. Thus, when it is distorted within its elastic limits, it will not return to its original shape.

Plastic cord 52 is flexible. Thus, it can be bent without breaking it.

In one preferred embodiment, plastic cord 52 is comprised of at least about 80 weight percent of polyvinyl chloride. It is even more preferred that plastic cord 52 contain at least about 90 weight percent of polyvinylchloride. In this embodiment, it is preferred that the plastic cord comprise an effective amount of an ultraviolet stabilizer.

Polyvinyl chloride cord is readily commercially available. Thus, by way of illustration and not limitation, one may purchase spools of "Stretchy, Round, Lacing Noodles" in lengths of 50, 100, or 3000 yards from Toner Plastics, Inc., 668 Dickinson Street, Springfield, Mass. 01108.

The plastic cord 52 used preferably has a maximum cross-sectional dimension (which is its diameter in the case of a cylindrical material) of at least about 0.06 inches. It is preferred that the maximum cross-sectional dimension of the stringing material be from about 0.06 to about 0.25 inches and, more preferably, is from about 0.08 to about 0.11 inches.

Figure 7:
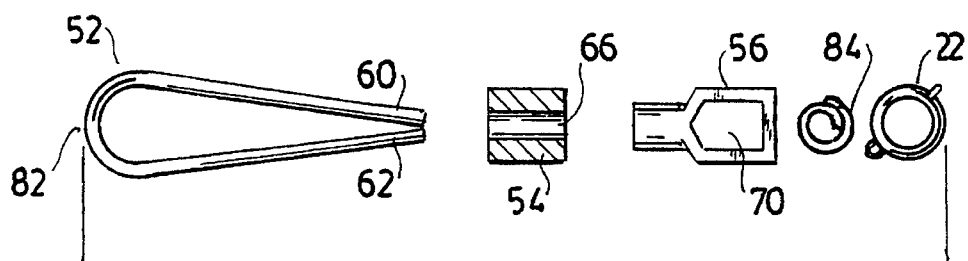
FIG. 7 is an exploded side view of another preferred frame holder of the invention.

Referring to FIGS. 6 and 7, it will be seen that ends 60 and 62 of plastic cord 52 may be placed together and, thereafter, placed through orifice 66 of barrel 54. Thereafter, ends 60 and 62 may be secured to fastener 56.

Barrel 54 preferably consists essentially of either plastic or glass. In one preferred embodiment, barrel 54 consists essentially of polymerized methyl methacrylate resin. In another preferred embodiment. In another preferred embodiment, barrel 54 is purchased as catalog number CB010 from the Foreign Details Company of 54 West 39th Street, New York, N.Y.; in this embodiment, barrel 54 is a cylinder with a length of 10 millimeters, a diameter of 10 millimeters, and a central orifice which is 0.118 inches. In yet another embodiment, bead 54 has a circular shape, a 12 millimeter diameter, a central orifice of 0.062 inches, and is purchased as catalog number L0112 from such Foreign Details Company.

As will be apparent to those skilled in the art, bead 54 can have substantially any desired shape, color, or design, as long as it has a central orifice which extends throughout its entire length and which has a substantially constant maximum dimension. The dimension of the orifice at one end of bead 54 will generally be within about 10% of the dimension of the orifice at the other end of bead 54.

In this embodiment, it is preferred to use beads with holes ranging from about 0.06 inches to about 0.16 inches. Thus, e.g., one may use a 3 millimeter bead with a hole of 0.118 inches, a 2 millimeter bead with a hole of 0.078 inches, etc.

Thus, by way of further description and illustration, when using the large 3/32" polyvinyl chloride strand 52 with a bead 54 made of either plastic or glass, with a 0.118 inch hole, a snug fit is obtained which permits movement of the bead 54 with a small amount of force, yet the bead 54 will remain in place without moving or changing positions. Since the polyvinyl chloride strand is formed into a half load, then two 0.93 inch diameter strands with a circumference of 0.2922 each forced into the 0.118 inch hole in the bead that has a circumference of 0.3707 inches (expand).

In general, it is preferred that bead 54 have a length of less than about 15 millimeters.

Referring again to FIGS. 6 and 7, it will be seen that ends 60 and 62, after they are extended through bead 54, may be secured to fastener 56 by conventional means. In the embodiment illustrated in FIGS. 6 and 7, fastener 65 is a crimp end. However, it will be readily apparent to those skilled in the art that other means of fastening ends 60 and 62 also may be used as long as such means contain an orifice, such as orifice 70. It is preferred that orifice 70 be defined by a substantially continuous perimeter of material around it to insure structural integrity of the assembly.

Crimp ends are well known to those skilled in the art and may be obtained, e.g., from Windstar, Inc. of 1265 Manassero Street, Suite 304, Anaheim, Calif. Thus, referring Windstar's 1990 catalog, one may purchase catalog number GFN 135 (necklace end).

Referring again to FIGS. 6 and 7, it will be seen that the frame holders depicted therein differ from each other. The frame holder 80 is adapted to be connected to split ring 84 of end 20 of necklace 14 (see FIG. 9). By comparison, the frame holder 82 of FIG. 7 is adapted to be connected to a split ring 84 which, in turn, is connected to solid ring assembly 22. It will be apparent to those skilled in the art that the use of intermediary split ring 84 provides a strong, secure assembly which will not readily break apart.

As is known to those skilled in the art, the aforementioned split rings, as well as all of the other components described hereinabove, are readily available. Thus, e.g., referring to the Creative Findings Ltd. catalog (published by Creative Findings Ltd. of 754 Branch Avenue, Providence, R.I.), one may purchase catalog numbers 696/5004 (crimp end), NSP 7 MM (spring ring), SPL 6 MM (split ring), SPL 7MM (split ring), and the like.

Figure 8:
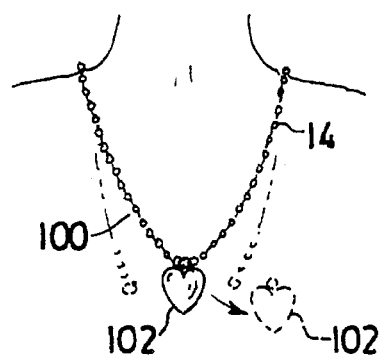
FIG. 8 is a front view depicting a preferred assembly of this invention being worn by a user.

FIG. 8 illustrates a preferred necklace 14 to which holders 80 and 82 have been attached. As will be apparent to those skilled in the art, the jewelry 102 attached to such holders may be readily removed or attached.

FIG. 9 illustrates some preferred embodiment of the invention in which, for the sake of simplicity of illustration, split ring 84 has been omitted.

Figure 10:
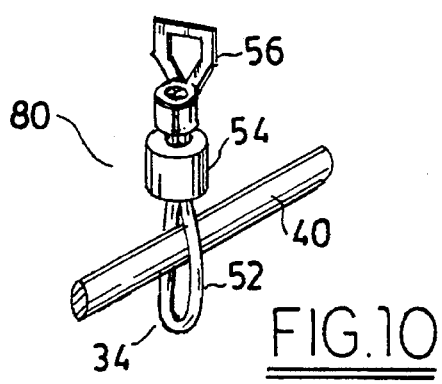
FIG. 10 is a partial perspective view illustrating how an eyeglass stem may be inserted through a loop of the frame holder of FIG. 7.
Figure 11:
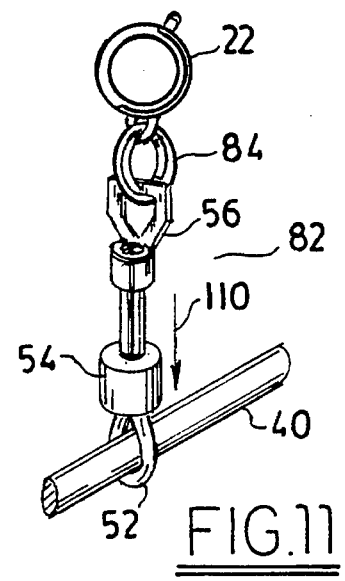
FIG. 11 is a partial perspective view illustrating how the loop of the holder of FIG. 10 may be tightened about the eyeglass stem.

FIG. 10 illustrates holder 90 with it end 34 in an untightened position. As will be apparent from FIG. 11, when barrel 54 is moved in the direction of arrow 110, the size of loop 34 decreases and it tightens around eyeglass stem 40.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

I claim:

1. An eyeglasses retaining assembly comprising an elongated flexible necklace with a proximal end and a distal end, a first spring ring attached to the proximal end of said necklace, a solid ring assembly attached to the distal end of said necklace, a second spring ring attached to said solid ring assembly, a first frame holder attached to said first spring ring, and a second frame holder attached to said second spring ring, wherein:

(a) said solid ring assembly is comprised of a first orifice and a ring of solid material continuously extending around said first orifice,
   (b) said first frame holder is comprised of a bead with a second orifice of substantially uniform dimensions extending through it, and a non-resilient strap material extending through said second orifice to define a loop exterior of said bead through which a stem of said eyeglasses can be inserted, wherein:
      1. said non-resilient strap material is comprised of a first end and a second end,
      2. said first frame holder is comprised of a fastener for securing said first end and said second end of said non-resilient strap material, wherein said fastener is comprised of a third orifice and a ring of solid material continuously extending around said third orifice;
   (c) said second frame holder is comprised of said bead with a second orifice of substantially uniform dimensions extending through it, and said non-resilient strap material extending through said second orifice to define a loop exterior of said bead through which a stem of said eyeglasses can be inserted, wherein said fastener is connected to a split ring, and said split ring is connected to said first spring ring.

2. The eyeglass retaining assembly as recited in claim 1, wherein said flexible necklace is a chain.

3. The eyeglass retaining assembly as recited in claim 1, wherein said necklace is a string of beads.

4. The eyeglass retaining assembly as recited in claim 1, wherein said string of beads is comprised of a stringing material which comprises a multiplicity of strands of stainless steel.

5. The eyeglass retaining assembly as recited in claim 1, wherein said solid ring assembly is a solid ring.

6. The eyeglass retaining assembly as recited in claim 1, wherein said solid ring assembly is a chain tag.

7. The eyeglass retaining assembly as recited in claim 1, wherein said non-resilient strap material is plastic tubing.

8. The eyeglass retaining assembly as recited in claim 7, wherein said plastic is polyvinyl chloride.

9. The eyeglass retaining assembly as recited in claim 8, wherein said polyvinyl chloride tubing has a diameter of at least about 0.6 inches.

10. The eyeglass retaining assembly as recited in claim 9, wherein said polyvinyl chloride tubing has a diameter of at least about 0.8 inches.

11. The eyeglass retaining assembly as recited in claim 10, wherein said bead consists essentially of plastic.

12. The eyeglass retaining assembly as recited in claim 10, wherein said bead consists essentially of glass.

13. The eyeglass retaining assembly as recited in claim 1, wherein said second orifice has a maximum dimension of from about 0.06 to about 0.16 inches.

14. The eyeglass retaining assembly as recited in claim 1, wherein said bead has a length of less than about 15 millimeters.

15. The eyeglass retaining assembly as recited in claim 1, wherein said fastener is a crimp end.

* * * * *